US008015122B2

(12) United States Patent
Elliott

(10) Patent No.: US 8,015,122 B2

(45) Date of Patent: Sep. 6, 2011

(54) CONTROL OF USE OF INK CARTRIDGE

(75) Inventor: James Neil Elliott, Chelmsford (GB)

(73) Assignee: Neopost Limited, Romford Essex (GB)

( * ) Notice: Subject to any disclaimer, the term of this patent is extended or adjusted under 35 U.S.C. 154(b) by 3469 days.

(21) Appl. No.: 09/770,613

(22) Filed: Jan. 29, 2001

(65) Prior Publication Data

US 2002/0060708 A1 May 23, 2002

(30) Foreign Application Priority Data

Jan. 29, 2000 (GB) .................................. 0001977.8

(51) Int. Cl.
*G06F 17/00* (2006.01)
*G06Q 10/00* (2006.01)

(52) U.S. Cl. ........................................ 705/410; 705/1.1

(58) Field of Classification Search .................... 377/15, 377/16; 705/401, 408, 1.1, 10
See application file for complete search history.

(56) References Cited

U.S. PATENT DOCUMENTS

| | | | | | |
|---|---|---|---|---|---|
| 4,752,950 | A | * | 6/1988 | Le Carpentier | 379/106.11 |
| 4,811,234 | A | * | 3/1989 | Storace | 705/403 |
| 5,068,806 | A | * | 11/1991 | Gatten | 358/1.14 |
| 5,243,654 | A | * | 9/1993 | Hunter | 380/51 |
| 5,457,642 | A | * | 10/1995 | Brookner | 177/25.15 |
| 5,489,926 | A | * | 2/1996 | Arbeiter | 347/16 |
| 5,655,174 | A | | 8/1997 | Hirst | |
| 5,862,243 | A | * | 1/1999 | Baker et al. | 382/101 |
| 5,894,313 | A | * | 4/1999 | Mabuchi | 347/7 |
| 6,003,966 | A | * | 12/1999 | Ahn | 347/7 |

FOREIGN PATENT DOCUMENTS

| | | | |
|---|---|---|---|
| DE | 19754663 | | 12/1997 |
| EP | 0825567 | | 2/1998 |
| GB | 2251210 | | 7/1992 |
| GB | 2301688 | | 12/1996 |
| JP | 11-277765 A | * | 10/1999 |
| WO | WO 99/36835 A1 | * | 7/1999 |

* cited by examiner

*Primary Examiner* — Fadey S Jabr

(74) *Attorney, Agent, or Firm* — Sughrue Mion, PLLC

(57) ABSTRACT

Postage metering apparatus is provided with a removably mounted print head module such as an inkjet cartridge with an integral ink supply. The module includes means responsive to the number of printing operations performed by the print head and to terminate operation of the print head when a predetermined number of operations have been performed. Upon termination of operation of the print head, a signal is sent to a microprocessor of the postage meter which then transmits information relating to use of the print head, and if desired postal register information, to a remote data center. The remote data center may then send an authorization signal permitting further operation of the print head.

13 Claims, 1 Drawing Sheet

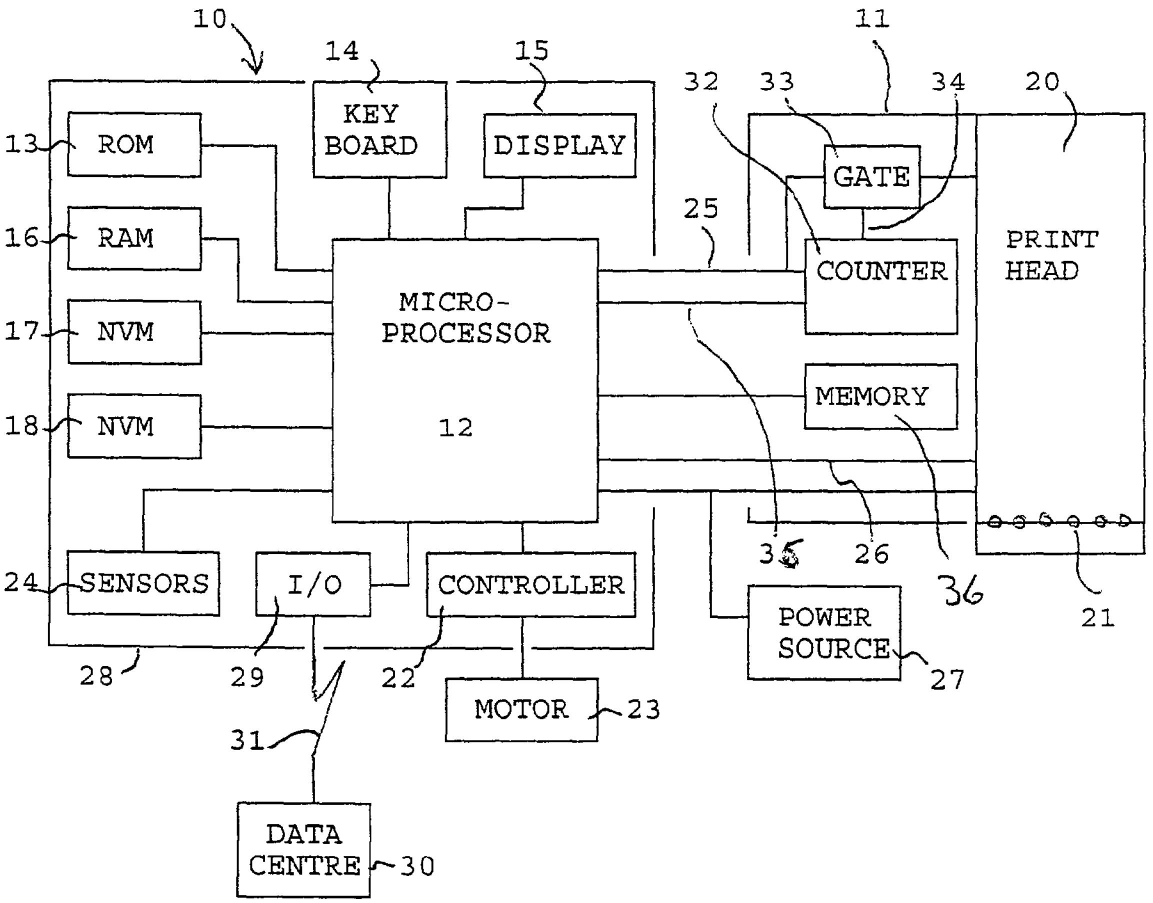
10
11
14
15
32
33
34
20
13
ROM
KEY
BOARD
DISPLAY
GATE
16
RAM
25
COUNTER
PRINT
HEAD
MICRO-
PROCESSOR
17
NVM
MEMORY
18
NVM
12
35
26
36
21
24
SENSORS
I/O
CONTROLLER
POWER
SOURCE
27
28
29
22
MOTOR
23
31
DATA
CENTRE
30

CONTROL OF USE OF INK CARTRIDGE

BACKGROUND OF THE INVENTION

This invention relates to use of an ink cartridge in printing apparatus and in particular to control of use of inkjet or other replaceable ink cartridges in postage meters.

Known inkjet cartridges include an inkjet print head and an ink reservoir integral therewith. In use of the cartridge to print impressions, ink is ejected from nozzles of the print head to print the impressions and is replenished from the ink reservoir. Over a period of operation of the cartridge, the amount of ink contained in the ink reservoir is gradually depleted until eventually the reservoir is incapable of replenishing the ink in the print head. When the reservoir is depleted to an extent that imprints of a desired quality cannot be printed by the print head of the cartridge, the entire cartridge is removed from the printing apparatus and is replaced with a new cartridge in which the ink reservoir is full of ink.

In some applications of use of inkjet cartridges, for example output printers for personal computers, there is no stringent requirement regarding the quality of the imprints obtained and the cartridge may be continued to be used until such time as the user decides that the print is becoming illegible. However in other applications of use of inkjet cartridges where a fully legible record of a transaction or other event is required it is desirable to provide a control of use of the cartridge such that the quantity of printing effected by the cartridge is limited and hence the cartridge cannot be used when the ink in the reservoir is so depleted that imperfect imprints are obtained. One application where a fully legible printed record of a transaction is required is in postage meters. Postage meters are required to carry out accounting operations in respect of postage charges in respect of mail pieces and to print a postal indicium on each mail piece providing evidence of the amount of postage charge applied to the mail piece and that accounting in respect of that specific postage charge has been effected. The postal authorities issue regulations determining the form and content of the postal indicia and also determining the minimum acceptable print quality of the printed postal indicia. Providers of postage meters are required to supply postage meters that inter alia print postal indicia with a quality that at least meets the minimum requirements at all times of operation of the postage meter.

SUMMARY OF THE INVENTION

According to one aspect of the invention a method of control of use of a print head of a print head module removably mounted in printing apparatus includes the steps of determining when the print head of said module has performed a predetermined number of printing operations; terminating operation of the print head when the print head has performed the predetermined number of printing operations; transmitting information relating to said use of the print head to a remote data centre and transmitting information from the data centre to the printing apparatus to control further operation of the print head.

According to a second aspect of the invention in a postage meter including a print head module removably mounted in the postage meter; said print head module including a print head; first means in said print head module determines a number of printing operations performed by said print head and inhibiting operation of the print head when a predetermined number of printing operations have been performed by said print head; second means in said postage meter responsive to operation of the print head and to transmit data relating to the operation of said print head to a remote centre; and said second means being operative in response to an authorisation signal from the remote centre to enable further operation of the print head.

BRIEF DESCRIPTION OF THE DRAWING

An embodiment of the invention will now be described by way of example with reference to the drawing which is a block diagram of a postage metering system.

DESCRIPTION OF THE PREFERRED EMBODIMENT

Referring to the drawing a postage meter comprises electronic accounting and control means 10 operable to carry out accounting and control functions and a print head cartridge 11 connected to and controlled by the electronic accounting and control means 10. The electronic accounting and control means 10 comprises a micro-processor 12 operating under program routines stored in a read only memory (ROM) 13. A keyboard 14 is provided for input of commands and data by a user and a display 15 displays information to a user of the postage meter. A random access memory (RAM) 16 is used as a working store for temporary storage of data during operation of the postage meter. Non-volatile duplicated memories 17, 18 store critical data relating to use of the postage meter and which is required to be retained even when the postage meter is not powered. The microprocessor 12 carries out accounting functions in relation to use of the postage meter in dispensing postage charges in respect of handling of the mail items by the postal authority or other carrier. Accounting data relating to use of the postage meter in dispensing postage charges as well as any other critical data to be retained is stored in the non-volatile memories 17, 18. The accounting data stored includes an accumulated total of value dispensed by the meter in franking mail items, a count of the number of mail items franked by the meter and a count of the number of mail items franked with a postage charge in excess of a predetermined value and, if the postage meter operates in a pre-payment mode of operation, a value of credit available for use by the meter in franking mail items. The value of credit is stored in a descending credit register, the accumulated total value is stored in an ascending tote register, the count of items is stored in an items register and the count of items franked with a postage charge in excess of a predetermined value is stored in a large items register. As is well known in the postage meter art, each of the registers referred to hereinbefore for storing accounting data is replicated to enable integrity of the accounting data to be maintained even in the event of a fault or termination of power to the meter during a franking operation. Two replications of each of the registers are provided in each of the memory devices 17, 18. Instead of storing a value of credit available for use in a descending register, an accumulated value of credit entered into the postage meter may be stored in an ascending register.

The print head cartridge contains an inkjet digital print head 20 having a plurality of inkjet nozzles 21 disposed in a line and an ink reservoir (not shown) integral with the digital print head. The ink reservoir provides a supply of ink to the inkjet nozzles 21 and during a printing operation print data signals output from the microprocessor 12 control actuation of the inkjet nozzles to eject ink droplets therefrom. During a printing operation the print head cartridge is traversed across a mail piece in a direction transverse to the line of nozzles 21, or the mail piece is transported past the line of inkjet nozzles, so that the line of inkjet nozzles scans across a print receiving area of the mail piece. The nozzles are actuated selectively by print data signals in a series of print cycles to print dots in selected positions in a series of columns in correspondence with the print cycles and thereby to print a complete postal indicia impression in the series of print cycles.

A motor controller 22 is controlled by the microprocessor 12 to control operation of a motor 23 for driving means (not shown) to cause the print head to traverse the mail piece, or for transporting the mail piece past the print head. Sensors 24 sense and monitor the state or movement of mechanical elements of the postage meter and in particular monitor relative movement between the inkjet nozzles of the print head and the mail piece. and output electrical signals to the microprocessor 12 indicative of the state or movement of the mechanical elements. On of the sensors 24 is responsive to relative motion between the print head and the mail piece and outputs signals to the microprocessor to enable the microprocessor to selectively actuate the inkjet nozzles of the print head at appropriate times in the series of printing cycles synchronised with the relative traversal motion between the print head the mail piece. During this relative motion of the print head the microprocessor outputs on line 25, in each of a series of printing cycles, print data signals selecting those ones of the inkjet nozzles which are to be energised in each respective printing cycle. The microprocessor 12 also outputs a series of strobe signals on line 26 that are synchronised with the relative traversal movement between the print head and the mail piece to actuate the selected inkjet nozzles in each printing cycle by supply of a pulse of electrical power is supplied to the selected inkjet nozzles from a power source 27.

It will be appreciated that, as is well known in the postage meter art, the postage meter is required to operate in a secure manner and be protected from attempts to use the meter fraudulently for example by utilising the postage meter to print postal indicia on mail items for which no corresponding postage charge has been accounted for by the accounting means. Accordingly those parts of the postage meter required to be secured against unauthorised tampering, in particular the microprocessor and non-volatile memories used in accounting for dispensing of postage, are housed in a secure housing 28.

The postage meter is also provided with an input/output interface 29 whereby the accounting and control means 10 may be placed in communication with a remote data centre 30 via a communication link 31. The accounting and control means 10 may be placed in communication with the data centre 30 for the purpose of carrying out a remote recrediting operation in which the remote data centre authorises the entry of credit into the postage meter and enables the microprocessor 12 to write an increased value of credit, as authorised by the data centre, into the credit register of the NVMs 17, 18.

As described hereinbefore, the print head cartridge 11 includes an ink reservoir integral with the print head. It will be appreciated that in use of the print head to print postal indicia, ink is ejected as droplets from the nozzles and the ink ejected from the nozzles is replenished from the ink reservoir. Accordingly during use of the print head the ink in the ink reservoir is gradually depleted. Commercially available cartridges having an integral ink reservoir are constructed as replaceable modules so that a print head cartridge in which the ink has been depleted can be removed and replaced by a new cartridge having an ink reservoir full of ink. Eventually, if the cartridge is not replaced, the ink would be depleted to an extent such that the quality of the imprints of postal indicia would deteriorate to below a minimum acceptable quality. In order to ensure that every postal indicium printed by the print head of the postage meter is of at least minimum acceptable quality means are provided to limit use of the print head cartridge to an extent such that a sufficient quantity of ink remains in the reservoir to ensure that each nozzle is fully supplied with ink from the reservoir.

The means to limit use of the print head cartridge comprises counter means 32 and gating means 33 mounted integrally with the print head 20 in the print head cartridge 11. The counting means 32 may be utilised to count the number of ink droplets ejected from the inkjet nozzles 21 of the print head or may be utilised to count the number of postal indicia printed by the print head. If the counting means is used to count the number of ink droplets ejected, the print data signals output from the microprocessor 12 on line 25 are input, as shown in the drawing, to increment the count in the counting means 32. The print data signals are also input to the gating means 33 which is controlled by an output 34 from the counting means 32. When a new print head cartridge is inserted in the postage meter, the count in the counting means is reset, for example to zero, by a reset signal on line 34 from the microprocessor 12 and the output of the counting means opens the gating means 33. The print data signals comprise strings of binary signals in which, for example, each inkjet nozzle that is to be actuated is represented by a binary "1" and each inkjet nozzle that is not to be actuated is represented by a binary "0". Accordingly, if binary "1" represents inkjet nozzles that are to be actuated, a count of ink droplets ejected from a print head cartridge is obtained by counting the number of binary "1's" occurring in the print data strings. With the gating means 33 open, the print data signals from the microprocessor are able to pass through the gating means to the print head 20 to select nozzles of the print head that are to be actuated. When the count in the counting means has been incremented by the print data signals to a count that is predetermined to be a limiting number of droplets that can be ejected by the print head cartridge, an output 34 from the counting means 32 closes the gating means 33 thereby inhibiting further operation of the print head. Instead of counting binary "1" signals in the print data strings, the counting means may be responsive to and count strobe signals from the microprocessor on line 26. This produces a count of the number of print cycles performed by the print head cartridge and provides an indication of the number of printing cycles performed by the print head. Since the total number of droplets ejected in printing each postal indicium is almost constant, a count of the number of print cycles provides a determination of the amount of use of the print head. It will be appreciated that the print head requires the input thereto of print data signals, strobe signals and power from the power supply 27. Accordingly, regardless of whether the counting means is responsive to print data signals or to the strobe signals, the gating means may be used to control the input of print data signals, strobe signals or power from the power source 27 to the print head.

It will be appreciated that postage meters print postal indicia on mail pieces to provide evidence that accounting for postage charges in respect of the mail pieces has been effected and hence stringent measures are required to ensure that illegal use of the postage meter or of a print head of the postage meter is prevented. The provision of counting means that generates a count indicative of the amount of use of the print head provides a check that the number of times the print head has been used to print a postal indicium accords with the number of postage dispensing transactions performed by the accounting means of the postage meter. Also as described hereinbefore, the provision of the counting means and gating means enables use of the print head cartridge to be terminated after a defined number of printing operations so as to prevent printing of postage indicia of unacceptable quality due to lack of ink.

When operation of the print head been terminated due to the count of the counting means indicating that the print head has been operated in a predetermined number of printing operations, the print head outputs a termination signal on line 35 to the microprocessor. In response to the receipt of the termination signal, the microprocessor initiates a communication via the I/O interface 29 and the communication link 31 with the data centre 30 in which the microprocessor outputs status data relating to the print head cartridge and operation of the print head. The status information may include an identification of the print head cartridge stored in a memory 35 of the print head cartridge, an identification of the postage meter with which the cartridge has been in use, the identification of the postage meter stored in the NVMs 17, 18, and the number of printing operations performed by the print head since installation of the cartridge in the postage meter. In addition if desired the status information may include an identification of the user of the postage or of the location where the postage meter is installed. When status information is sent to the data centre, register data relating to use of the postage meter in dispensing postage charges may also be sent. Receipt of the status information together with the register data enables the data centre to determine if the use of the print head cartridge is in accordance with the postage dispensing transactions effected by the accounting means.

Instead of the microprocessor sending the status information in response to the termination signal from the print head cartridge, the microprocessor may provide an indication on the display 15 to the user of the postage indicating that the number of printing operations performed by the print head has reached a limit for the cartridge. The user may then enter appropriate instructions by means of the keyboard 14 to initiate a communication with the data centre to send the status information.

The number of printing operations permitted to be performed by the counter and gating means may be significantly less than the number of printing operations for which there is ink available in the ink reservoir. After termination of operation of the print head, further operation of the print head may be permitted when authorised by the data centre. After transmission of status information to the data centre from the postage meter, the data centre sends an authorisation signal to the microprocessor 12 and in response to receipt of this authorisation signal the microprocessor resets the count of the counting means 32 so that a further defined number of printing operations may be performed by the print head. The counter may be reset in such a manner that the print head is permitted to perform a number of operations equal to the number of printing operations initially permitted or may be reset to a state such that a lesser number of further printing operations are permitted. The counter may be permitted to be reset only once after termination of operation of the print head or may be permitted to be reset more than once thereby permitting the print head to be operated to carry out a predetermined further number of printing operations after each reset of the count. Authorisation to permit further use of the print head may be utilised to permit limited use of the print head in an emergency when the print head has performed the predefined number of printing operations and further operation has been terminated and no replacement cartridge is available to the user.

As described hereinbefore, the gating means 33 is controlled by the output from the counting means 32 and the counting means is reset by the microprocessor when further operation of the print head is authorised. However the gating means may be controlled by an output of a comparison circuit which receives as inputs the count of the counting means and a predetermined number stored in memory 35, the predetermined number being equal to the number of permitted printing operations of the print head. When the count equals the predetermined number the gating means is closed. In response to authorization of further printing operations, instead of resetting the count as hereinbefore described, the number stored in the memory is incremented by the microprocessor to a larger value equal to the total number of printing operations that are authorised to be performed by the print head.

Use of the print head cartridge may be subject to certain conditions, for example, to payment by the user in respect of a defined number of printing operations. After initial use of the print head cartridge for the defined number of printing operations, further use of the print head cartridge for the defined number of printing operations may be authorised by the data centre upon payment by the user for such further use of the print head cartridge. If desired payment for use of the print head cartridge may be effected at the same time as credit is entered into the postage meter in a remote recrediting procedure with the data centre.

If desired a further condition for authorising a further number of printing operations is an analysis of the quality of print being produced by the print head. This may be effected by causing the print head to print a sample imprint which is sent to the data centre. For this purpose, the microprocessor would enable the print head cartridge to permit one printing operation of the print head to print the sample imprint. The data centre would be provided with a reader capable of reading the imprint to determine if the quality of the imprint is at least equal to a minimum acceptable standard. Transmission of the authorisation signal to the postage meter is then dependent upon a determination that the imprint is acceptable. If desired the imprint may contain all the information that is required to be sent from the postage meter to the data centre to obtain authorisation for the print head cartridge to used for a further number of printing operations as hereinbefore described. The information in the imprint may be in 2D or Datamatrix format.

I claim:

1. A method of controlling use of a print head of a print head module removably mounted in printing apparatus, including the steps of:

determining, by a processor, a number of printing operations performed by the print head of the print head module;

terminating operation of the print head when the print head has performed a predetermined number of printing operations;

transmitting information relating to the number of printing operations performed by the print head to a remote data center; and transmitting information from the data center to the printing apparatus to control further operation of the print head.

2. A method as claimed in claim 1, wherein the print head module includes an ink jet print head including a plurality of inkjet nozzles and an ink reservoir supplying ink to the inkjet nozzles, and the step of determining the number of printing operations performed by the print head includes counting the number of ink droplets ejected by the inkjet nozzles.

3. A method as claimed in claim 2, wherein selection of the inkjet nozzles to be operated is controlled by a string of print data signals, with the print data signals of the string corresponding one to each inkjet nozzle respectively and the inkjet nozzles corresponding to print data signals of first value being selected for operation, and wherein the step of counting the number of inkjet droplets ejected by the inkjet nozzles is effected by counting the print data signals of first value.

4. A method as claimed in claim 1, wherein the printing apparatus includes postage metering means, and further including the step of:

transmitting information relating to operation of the postage metering apparatus with the transmission of the information relating to the use of the print head.

5. A postage meter apparatus including comprising:

a print head module removably mounted therein, wherein the print head module includes a print head and first means for determining a number of printing operations performed by the print head and inhibiting operation of the print head when a predetermined number of printing operations have been performed by the print head, and the postage meter includes second means responsive to operation of the print head and to transmit data relating to the number of printing operations performed by the print head to a remote center, and operative in response to an authorization signal from the remote center to enable further operation of the print head.

6. A postage meter apparatus as claimed in claim 5, wherein the first means includes a counter incremented in response to printing of a postal indicium and gate means operative in response to the counter being incremented to a predetermined count to inhibit operation of the print head.

7. A postage meter apparatus as claimed in claim 5, wherein the print head is an inkjet printing device including a plurality of inkjet nozzles, and the first means includes a counter incremented in response to each operation of each ink jet nozzle and gate means operative in response to the counter being incremented to a predetermined count to inhibit operation of the print head.

8. A postage meter apparatus as claimed in claim 5, wherein the second means is operative to transmit the data relating to the number of printing operations performed by the print head to the remote center in response to inhibition of the print head by the first means.

9. A postage meter apparatus as claimed in claim 5, wherein the second means is operative to display an indication to a user of the postage meter in response to inhibition of the print head by the first means, and operable by the user to transmit the data relating to the number of printing operations performed by the print head to the remote center.

10. A postage meter apparatus as claimed in claim 5, wherein the second means also transmits data relating to operation of the postage meter to the remote center.

11. A postage meter apparatus as claimed in claim 5, wherein the second means is operative to enable the print head to operate for a further number of operations determined by the authorization signal received from the remote center.

12. A postage metering system including a postage meter apparatus as claimed in claim 5, wherein, after termination of operation of the print head by the first means, the print head is operable to print an imprint for assessment by the remote center and the authorization signal in response to the imprint being assessed as being of acceptable quality.

13. A postage metering system as claimed in claim 12, wherein the print head is operable to print an imprint containing the data relating to operation of the print head.

* * * * *